March 28, 1961 I. M. DAVIDSON ET AL 2,977,068
JET PROPELLED AIRCRAFT
Filed Sept. 12, 1956 5 Sheets-Sheet 1

March 28, 1961     I. M. DAVIDSON ET AL     2,977,068
JET PROPELLED AIRCRAFT

Filed Sept. 12, 1956     5 Sheets-Sheet 2

Ivor Macaulay Davidson
Brian Stapleton Stratford
*Inventors*

By Stevens, Davis, Miller & Mosher
*their Attorneys*

March 28, 1961 I. M. DAVIDSON ET AL 2,977,068
JET PROPELLED AIRCRAFT
Filed Sept. 12, 1956 5 Sheets-Sheet 3

Ivor Macaulay Davidson
Brian Stapleton Stratford
Inventors
By
Stevens, Davis, Miller & Mosher
their Attorneys March 28, 1961     I. M. DAVIDSON ET AL     2,977,068
JET PROPELLED AIRCRAFT Filed Sept. 12, 1956     5 Sheets-Sheet 4

Ivor Macaulay Davidson
Brian Stapleton Stratford
Inventors

By
Stevens, Davis, Miller & Mosher
Attorneys

United States Patent Office 2,977,068
Patented Mar. 28, 1961

2,977,068
JET PROPELLED AIRCRAFT
Ivor Macaulay Davidson and Brian Stapleton Stratford, Farnborough, England, assignors to Power Jets (Research and Development) Limited, London, England, a British company Filed Sept. 12, 1956, Ser. No. 609,437
Claims priority, application Great Britain Sept. 28, 1955
3 Claims. (Cl. 244—15)

This invention relates to jet propelled aircraft and in particular to aircraft powered by turbo-prop engines, i.e. gas turbine engines driving propellers. It also relates to a flying control system for such an aircraft.

In copending United States patent application Serial No. 543,212, filed October 27, 1955, in the names of the present applicants, there is described an aircraft in which a number of turbo-jet engines discharge propulsive jet streams through shallow elongated contiguous nozzles extending spanwise along the wings, and so arranged that the combined jet streams leave the trailing edge of each wing as a long thin continuous spanwise extending jet sheet. This jet sheet acts as a "jet flap" which interacts with the main stream flow around the wing in such a way as to greatly increase the aerodynamic lift thereon. By deflecting the jet sheets upwardly or downwardly, the lift on the wings can be varied and control of the aircraft effected.

In a turbo-prop engine, the greater part of the engine power goes to drive the propeller but there is a certain amount of propulsive thrust available from the exhaust stream. The present invention makes use of the exhaust stream to increase the aerodynamic lift on the aircraft wings by the "jet flap" effect referred to above.

Accordingly the invention provides an aircraft wing having at least one turbo-prop engine mounted therein wherein the engine is connected to discharge its exhaust gas stream rearwardly through at least one jet nozzle so arranged that the stream leaves the wing as a long thin jet sheet extending continuously spanwise along the wing trailing edge, a jet deflector being provided operable to deflect the jet sheet downwardly from the rearward direction.

There may be a plurality of turbo-prop engines connected to discharge their exhaust gas streams rearwardly through jet nozzles so arranged that the combined streams leave the wing as a long thin jet sheet extending continuously spanwise along the wing trailing edge.

Preferably the jet sheet extends along a major part of the wing span and it may extend as nearly as possible from wing tip to root.

According to a feature of the invention the propeller or the propellers driven by the engine or engines is or are arranged so that its slipstream extends or their combined slipstreams extend continuously along the rear of the wing to at least the same extent as the flap.

Under take-off conditions, the power developed by turbo-prop engines is commonly greatly in excess of that developed under cruising conditions. According to a further feature of the invention, means are provided for varying the area of the nozzle or nozzles, their areas being reduced on take-off and landing whereby the proportion of power going to the exhaust stream is increased relative to that going to drive the propeller. The jet nozzle area may be reduced at the same time as the jet sheet is deflected downwardly from the rearward direction for take-off or landing.

The wing may further comprise a trailing edge wing flap so arranged that the jet sheet is discharged along a path following its upper surface, the flap being movable to cause the jet sheet to be discharged rearwardly or in a downwardly inclined direction at will.

The jet deflector may further be divided in a spanwise sense into at least two sections which can be set at an angle to one another and are angularly movable together with or without an angular displacement between them.

The jet deflector may also be operable to deflect the jet sheet upwardly from the rearward direction.

The invention also provides an aircraft having a pair of wings as aforesaid and comprising means to operate the jet deflectors to deflect the two jet sheets downwardly together through a comparatively large angle and also to deflect the two jet sheets upwardly or downwardly through a comparatively small angle about any given position either together or differentially at will.

The invention will now be more fully described by way of example with reference to the accompanying diagrammatic drawings, of which:

Figure 1:
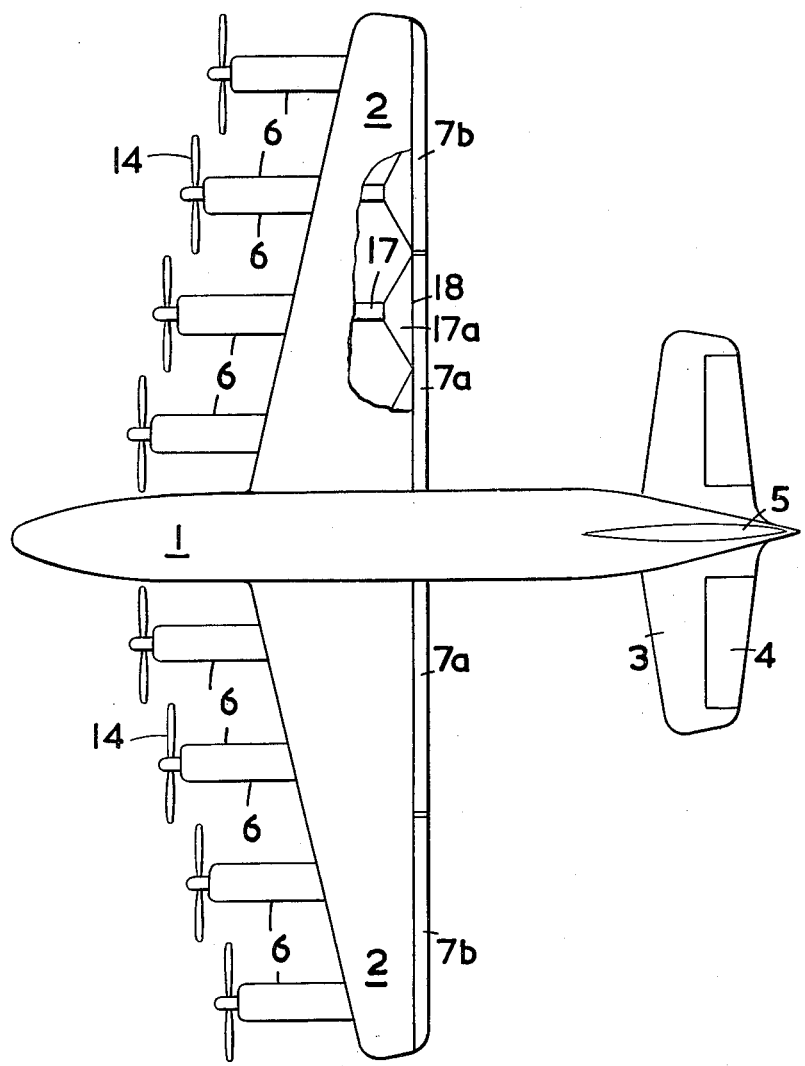
Figure 1 is a plan view of an aircraft, part of the upper surface of one wing being shown as broken away.

In Figure 1, the aircraft comprises a fuselage 1, lying along the aircraft fore and aft centre line, wings 2 extending one on each side thereof, a tailplane 3 having an elevator 4, and a fin and rudder 5. The aircraft is powered by eight turbo-prop engines, four in each wing, the engines being mounted in nacelles 6 extending forwardly from the wing leading edges in the usual manner.

Figure 2:
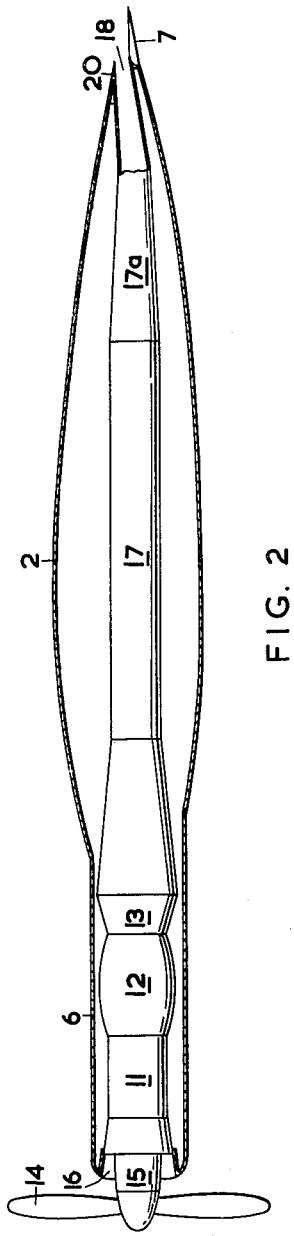
Figure 2 is a fore and aft cross-sectional view through one wing of the aircraft shown in Figure 1.

Referring now to Figure 2, each engine comprises a compressor 11, combustion system 12 and turbine 13 with the usual auxiliaries and drives a propeller 14 at the front of the engine through a gear box 15. Air for the compressor is drawn in through an annular intake 16 in the front of the nacelle. The turbine discharges its exhaust stream through a jet pipe 17 which extends chordwise through the wing and includes a rear transition portion 17a which changes progressively in cross-section from circular to terminate in a shallow elongated spanwise extending jet nozzle 18. As shown in Figure 1 the nozzles in each wing are contiguous at their ends and together constitute a jet nozzle aperture extending continuously spanwise of the wing as nearly as possible from root to tip consistent with structural requirements, from which the exhaust gas streams are discharged as a long jet sheet also extending substantially from wing tip to root.

Figure 4:
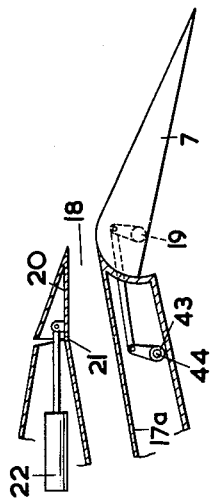
Figures 3 and 4 are enlarged cross-sectional views of the trailing edge of the wing.

Mounted at the rearward extremity of each wing is a jet deflector in the form of a hinged trailing edge wing flap 7 which, as shown in Figure 1, is divided in a spanwise sense into equal inboard and outboard sections 7a, 7b. The jet nozzles 18 are arranged at the junction of the wing flap with the fixed part of the wing so that the jet sheet is discharged over the upper surface of the flap. As shown most clearly in Figure 3, the nozzles are directed to discharge the jet sheet upwardly at a small angle, say 10 to 15° to the horizontal, but when the flap is in its datum position shown in Figure 3 with its upper surface horizontal, it induces the sheet to follow a path along its upper surface (due to Coanda effect) so that the sheet is discharged in a rearward direction. The flap is mounted for pivotal movement about an axis 19 (by means to be described below). It may be turned downwardly as shown in Figure 4, in which the case the jet sheet is induced to follow its upper surface so that it is discharged in a downwardly inclined direction. The flap can also be turned upwardly to a position in which its upper surface is aligned with the direction of discharge of the nozzles 18 so that the jet sheet is allowed to discharge upwardly in an inclined direction.

The flap is shown as being pivoted about an axis within the wing profile, but it may be mounted in guides so that it turns about a virtual axis below the wing.

Figure 8:
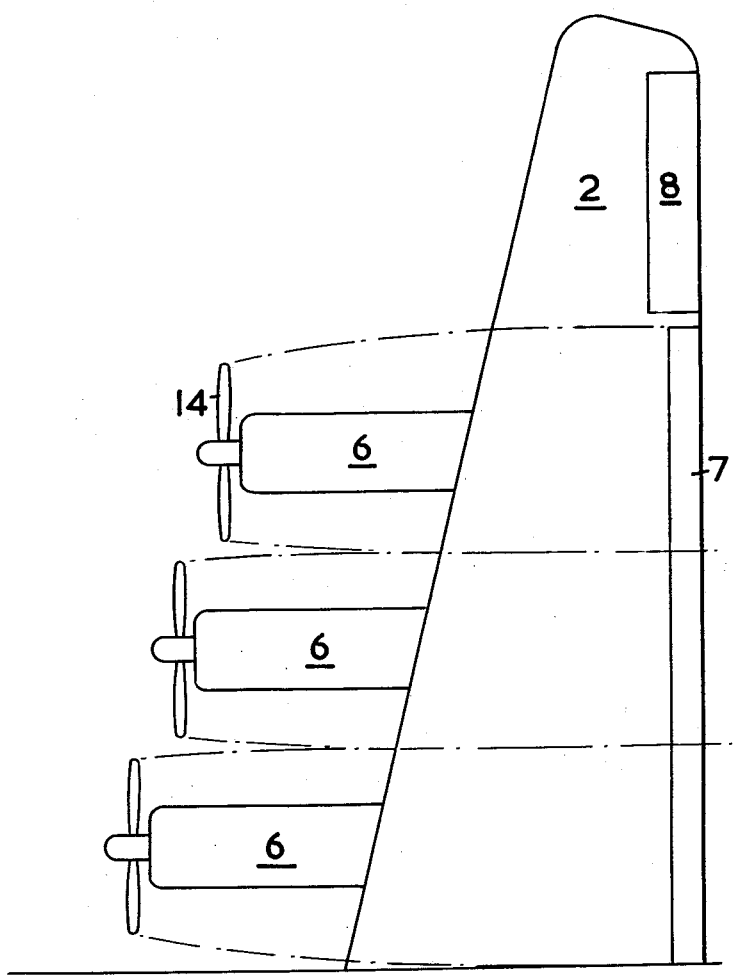
Figure 8 is a plan view of one wing of another aircraft showing a modified form of the invention.

Although the nozzles 18 and the flaps 7 preferably extend along substantially the full span of each wing, structural requirements may in some cases make it necessary to restrict their spanwise extent. Thus as shown in Figure 8, the flap 7 and the nozzles 18 extend along as little as, but not substantially less than, two thirds of the full span of the wing. In any case they extend along a major part, i.e. more than 50%, of the wing span. In this embodiment, the wing is provided with ailerons 8 outboard of the flaps.

The flap 7 need only be of quite short chord say, 2 to 5% of the total local wing chord, and in any case not more than about 10 or 12%.

The upper edges of the jet nozzles 18 are defined by a small flap 20 (which may be divided spanwise into sections corresponding to the nozzles 18) hinged about a transverse axis 21 and movable by means of a hydraulic jack 22 to vary the area of the jet nozzle.

The turbo-prop engines and their propellers are so arranged in each wing that the propeller slipstreams together extend continuously along substantially the full span of the wing. As shown in Figure 1 the engines and propellers are progressively set back along the swept back leading edge of the wing and in frontal view the propeller discs overlap to a small extent. This overlap however may not always be necessary. In the embodiment of Figure 8 (in which there are only three engines in each wing 2) the individual slipstreams from the propellers 14 are shown as having spread laterally to fill the gaps between them (as indicated by the dotted lines) by the time they reach the rear of the wing. In any case however the spanwise extent of the combined slipstreams is preferably not less than the spanwise extent of the jet nozzles 18 and flap 7.

When the jet sheet from a wing is deflected downwardly it acts as a jet flap which interacts with the slipstream from the propellers and with the main stream flow around the wing in such a way that the aerodynamic pressure distribution over the wing is considerably modified and the aerodynamic lift on the wing substantially increased, the increase becoming greater with increased deflection of the jet sheet. Thus by varying the deflection of the jet sheets by means of the flaps 7, the lift on the wings of the aircraft can be controlled in the manner described in said copending application Serial No. 543,212.

Figure 5:
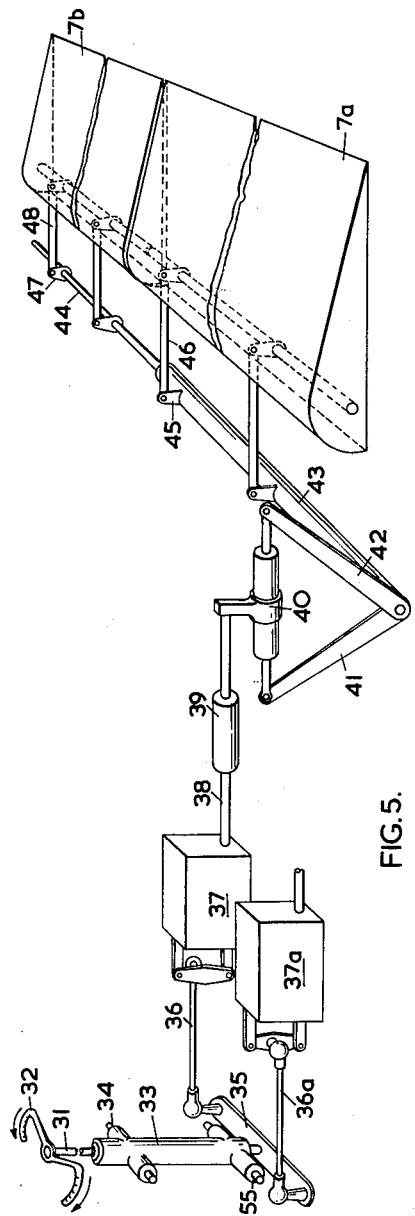
Figures 5 and 6 are schematic views of parts of the aircraft flying control system.
Figure 6:
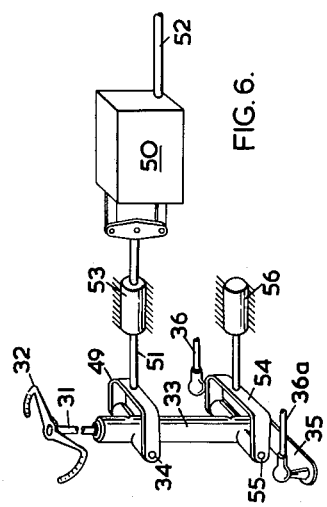

The flaps 7 and the elevators 4 are actuated by the control system shown in Figures 5 and 6; these show parts of the same system but part has been omitted from each for the sake of clarity, Figure 5 showing only the part for operating the flaps and Figure 6 only the part for operating the elevators. The system (part of which is the same as that described in copending United States patent application Serial No. 447,200 filed August 2, 1954, now abandoned, in the name of Davidson), comprises a pilot's control column 31 having a handwheel 32 on top and rotatably mounted in a tubular casing 33 which is itself rotatable about a horizontal axis in bearings 34. To the lower end of the column 31, below the pivotal axis of the casing, is secured a transverse lever 35 to the ends of which are jointed links 36, 36a connected to flap actuators of known type shown diagrammatically at 37, 37a (see Figure 5). Each actuator operates the flap in one wing through an extendable rod 38 incorporating a hydraulic jack 39 (thus constituting a variable length link) connected at its end to the mid point of a double ended hydraulic jack 40 connecting the ends of two levers 41, 42. These levers are rigidly mounted on the ends of two coaxial torsion bars 43, 44 respectively, extending spanwise within the wing and nested one within the other. The outer torsion bar 43 carries cranks 45 for operating the inboard section 7a of the flap through links 46 while the inner torsion bar 44 projects beyond the end of the outer torsion bar 43 and is similarly connected to operate the outboard section 7b of the flaps by means of cranks 47 and links 48.

It will of course be understood that Figure 5 shows the flying controls for one wing only, and that the actuator 37a is similarly connected to operate the flap 7 in the other wing.

The control column is also operable to actuate the elevators 4. A bracket 49 (see Figure 6) connects the bearings 34 on the casing 33 to an actuator 50 through a rod 51, the actuator being connected to the elevators through link 52. The rod 51 includes a hydraulic lock 53. A further bracket 54 is connected to bearings 55 on the casing 33 and is linked to a second hydraulic lock 56. The column can pivot either about bearings 34 or about bearings 55 depending upon whether lock 53 or lock 56 is set in the locked position.

Figure 7:
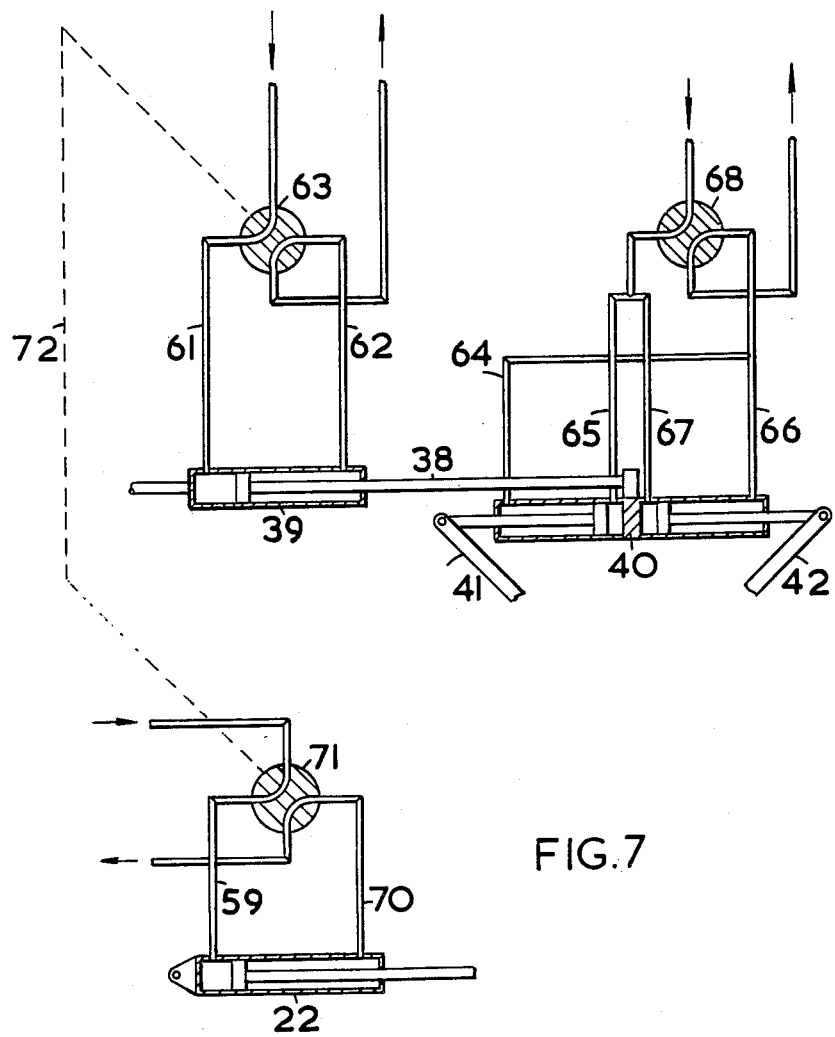
Figure 7 is a diagram showing the hydraulic system for actuating certain components of the flying control system.

As shown in Figure 7 the hydraulic jack 39 is supplied with hydraulic fluid through pipes 61, 62 and reversing valve 63. Similarly the double ended hydraulic jack 40 is supplied with hydraulic fluid through pipes 64, 65, 66, 67 and a common reversing valve 68. This figure also shows the hydraulic jack 22 for operating the flap 20 (see Figures 3 and 4) which is supplied with hydraulic fluid through pipes 69 and 70 and reversing valve 71. As indicated diagrammatically by the dotted lines at 72 the valves 63 and 71 are under a common control separate from the control column as will be explained more fully below. The valves 63, 68, 71 shown are connected to control the supply of hydraulic fluid to the corresponding jacks in both wings.

Figure 3:
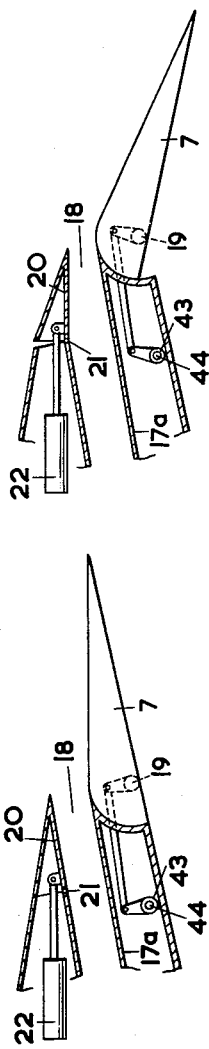

For normal forward flight, the wing flap 7 is set in the datum position shown in Figure 3 so that the jet sheet is discharged rearwardly, and the flap 20 is in the position corresponding to the jet nozzle 18 being fully open. Under these conditions, the back pressure on the turbines 13 is small and the greater part of the pressure drop in the engine occurs across the turbine so that practically all the engine power goes to drive the propellers 14, only a comparatively small amount of thrust being obtained from the exhaust streams. The hydraulic lock 53 is set in its locked position so that the elevators 4 are inoperative and the control column and casing are free to pivot about the bearings 34. By moving the column bodily about these bearings the two flaps can be moved upwardly or downwardly together thereby deflecting the two jet sheets upwardly and downwardly to decrease or increase the lift on the wings together and thus to give a control which is an alternative to elevator control in a conventional aircraft. If the column 31 is turned in its casing 33 the flaps are moved and the jet sheets deflected differentially to vary the lift on one wing relatively to the lift on the other and thus to give the equivalent of aileron control in a conventional aircraft. The movement of the flaps which can be effected by the control column is comparatively small, say 10° and in any case not more than about 20° upwardly or downwardly.

For steady flight at supersonic speeds, the lock 53 may be unlocked and the lock 56 set in the locked position. In this case, the control column will be free to pivot about bearings 55 and bodily movement thereof will operate the elevators 4 in the usual manner. It will however still be possible to turn the control column 31 in the casing 33 to operate the flaps 7 differentially to give the equivalent of aileron control.

In an alternative arrangement the whole tailplane may be mounted for pivotal movement in response to movement of the control column, and, in any case, it may be angularly adjustable for trimming purposes.

For take off and landing, the reversing valve 63 is turned to the position shown in Figure 7 to supply hydraulic fluid to extend jacks 39 so that the flaps 7 in each wing are lowered through a comparatively large angle which may be as much as 70°. The jet sheets tend to follow the flap upper surfaces and are thus deflected downwardly through a corresponding angle. At the same time the hydraulic jacks 22 are also actuated by means of the common control 72 indicated in Figure 7 to move the flaps 20 to reduce the jet nozzle area with the result that the back pressure on the turbine is increased, the pressure drop across the turbine is reduced and the engine power output is redistributed so that a greater proportion goes to the jet stream. The downwardly directed jet sheets leaving the rear of the wings act as "jet flaps" which give rise to a substantial increase in the aerodynamic lift on the wings as explained above.

It will be seen when the flaps are lowered they are still movable either together or differentially by means of the pilot's control column through a comparatively small angle on either side of their lowered position so that control of the aircraft on landing or take off can be effected.

The flap lowering mechanism may be such that the flaps can be lowered to any one of a number of positions, e.g., to one position for landing and to another for take off.

When coming in to land it is necessary to reduce the forward speed of the aircraft, and accordingly, provision is also made for using the flaps 7 as air brakes. The valve 68 is turned to the position shown in Figure 7 so that hydraulic fluid is supplied to the double ended jack 40 so that it is extended to force apart the levers 41, 42. These turn the torsion bars 43, 44 so that the inboard and outboard sections 7a, 7b, of the flaps in each wing and the corresponding sections of the jet sheets are set "out of phase," i.e., at an angle to one another. Vortices are thereby set up at the junctions of the sections of the flaps and jet sheets, giving rise to an increase in induced drag which effects a reduction in the forward speed of the aircraft.

As the speed of the aircraft is reduced, the sections of each flap are returned to the "in phase" position, and this might be done automatically by a control dependent, for example, on forward speed. At the same time the flaps 7 may be lowered and the jet nozzle area reduced so that increased lift due to the "jet flap" effect will compensate for the reduction of lift due to reduction of forward speed.

The flaps 7 may of course be divided into a greater number of sections. It will be seen that the flaps 7 can be operated by the pilot's control column in the manner previously described whether they are set "in phase" or with a selected angular displacement between them, i.e. the flaps can be operated to deflect the jet sheets upwardly or downwardly about any given position thereof.

The turbo-prop engines may be of any known type. Thus they may be of the single shaft type comprising a single turbine rotor driving both the compressor and the propeller, but to allow for the varying distribution of power between the propeller and compressor, they are preferably of the free turbine type, i.e. comprising a compressor, a combustion system, a first turbine rotor driving the compressor rotor and a second mechanically independent turbine rotor driving the propeller through the gear box.

For a single shaft engine, the compressor and therefore the turbine rotational speed must not be allowed to drop as the back pressure is raised by reducing the jet nozzle area. Accordingly, as the jack 22 is actuated, the propeller pitch must be changed to reduce the power it absorbs, so leaving the power absorbed by the compressor unaltered. There may also be an engine governer driven from the turbine and designed to vary the fuel supply to the combustion system in a sense to maintain the turbine and compressor rotational speed at any value selected by the pilot, independently of propeller pitch and the position of the flap 20.

For a free turbine engine, there may again be a governor arranged to maintain constant compressor speed, but the propeller pitch need not be uniquely related to the position of the flap 20.

We claim:

1. An aircraft comprising a wing; a plurality of turbo-prop engines mounted on and distributed along the span of the wing; means defining a plurality of long shallow rearwardly directed jet nozzles which are contiguous at their ends and together extend continuously spanwise of the wing, said engines being connected to discharge their exhaust gas streams through said nozzles and said nozzles being shaped and directed so that the combined streams leave the wing in a rearward direction as a long thin jet sheet extending continuously span-wise along the wing trailing edge; a jet deflector operable to deflect the jet sheet downwardly from the rearward direction; each said engine having a propeller, said propellers being so arranged in relation to the wing and of such a size that the slipstreams therefrom flow rearwardly over the wing and together extend spanwise along the wing trailing edge to at least the same extent as the jet sheet.

2. An aircraft comprising a wing; at least one turbo-prop engine mounted on the wing; means defining at least one rearwardly directed jet nozzle, said engine being connected to discharge its exhaust gas stream through said nozzle and said nozzle being shaped and directed so that the stream leaves the wing in a rearward direction as a long thin jet sheet extending spanwise along at least part of the wing trailing edge; obturating means for varying the area of the jet nozzle; a jet deflector operable to deflect the jet sheet downwardly from the rearward direction; and means interconnecting said obturating means and said jet deflector and operable to actuate said obturating means to reduce the jet nozzle area when the jet deflector is actuated to deflect the jet sheet downwardly from the rearward direction; said engine having a propeller so arranged in relation to the wing and of such a size that the slipstream therefrom flows rearwardly over the wing and extends along the wing trailing edge in a spanwise sense and said part of the wing trailing edge lies at least partly within the slipstream.

3. An aircraft comprising a wing; a plurality of turbo-prop engines mounted on and distributed along the span of the wing; means defining a plurality of rearwardly directed jet nozzles, said engines being connected to discharge their exhaust gas streams through said nozzles and said nozzles being shaped and directed so that the combined streams leave the wing in a rearward direction as a long thin jet sheet extending continuously spanwise along at least part of the wing trailing edge; obturating means for varying the area of the jet nozzles; a jet deflector operable to deflect the jet sheet downwardly from the rearward direction; and means interconnecting said obturating means and said jet deflector and operable to actuate said obturating means to reduce the jet nozzle area when the jet deflector is actuated to deflect the jet sheet downwardly from the rearward direction; each said engine having a propeller, said propellers being so arranged in relation to the wing and of such a size that the slipstreams therefrom flow rearwardly over the wing and together extend along the wing trailing edge in a spanwise sense and said part of the wing trailing edge lies at least partly within the combined slipstreams.

(References on following page)

References Cited in the file of this patent

UNITED STATES PATENTS

| | | |
|---|---|---|
| 1,916,475 | Hall | July 4, 1933 |
| 2,162,956 | Lysholm | June 20, 1939 |
| 2,396,911 | Anxionnaz | Mar. 19, 1946 |
| 2,420,423 | Meyer | May 13, 1947 |
| 2,466,466 | Morrison | Apr. 5, 1949 |
| 2,537,772 | Lundquist et al. | Jan. 9, 1951 |
| 2,566,961 | Poole | Sept. 4, 1951 |

FOREIGN PATENTS

| | | |
|---|---|---|
| 55,382 | France | Jan. 9, 1952 |